United States Patent [19]

Takano et al.

[11] Patent Number: 5,325,244
[45] Date of Patent: Jun. 28, 1994

[54] MAGNETIC RECORDING DATA STORAGE SYSTEM

[75] Inventors: Hisashi Takano, Kodaira; Kyo Akagi, Fuchu; Mikio Suzuki, Kokubunji; Yoshibumi Matsuda, Hachiouji; Takeshi Nakao, Sagamihara; Yoshinori Miyamura, Nishitama; Fumio Kugiya, Hachiouji; Masaaki Futamoto, Tsukui; Hideki Sawaguchi, Kodaira; Nobuyuki Inaba, Hasuda; Takayuki Munemoto, Niihari; Kenji Mori, Tsuchiura; Hirotsugu Fukuoka, Hitachioota; Tokuho Takagaki, Odawara, all of Japan

[73] Assignee: Hitachi, Ltd., Tokyo, Japan

[21] Appl. No.: 843,265

[22] Filed: Feb. 28, 1992

[30] Foreign Application Priority Data

Feb. 28, 1991 [JP] Japan ................................. 3-034007

[51] Int. Cl.$^5$ .............................................. G11B 5/58
[52] U.S. Cl. ............................. 360/77.03; 360/77.05; 360/77.16
[58] Field of Search ............... 360/77.01, 77.02, 77.03, 360/77.16, 113, 77.05, 77.08

[56] References Cited

U.S. PATENT DOCUMENTS

| | | | |
|---|---|---|---|
| 4,547,824 | 10/1985 | Best et al. | 360/113 |
| 4,633,451 | 12/1986 | Ahn et al. | 360/14 |
| 4,639,906 | 1/1987 | Goto | 360/77.03 |
| 4,816,939 | 3/1989 | Ford et al. | 360/77.03 |
| 4,858,040 | 8/1989 | Hazebrouck | 360/77.02 |
| 4,961,123 | 10/1990 | Williams et al. | 360/77.03 |
| 5,067,039 | 11/1991 | Godwin et al. | 360/77.03 |
| 5,189,578 | 2/1993 | Mori et al. | 360/77.02 |

FOREIGN PATENT DOCUMENTS

| | | |
|---|---|---|
| 96571 | 6/1984 | Japan . |
| 19950 | 4/1988 | Japan . |
| 19951 | 4/1988 | Japan . |

OTHER PUBLICATIONS

Lambert et al., *Reduction of Edge Noise in Thin Film Media*, IEEE Transactions; Sep., 1989.
Nakanishi et al., *High Track Density Head Positioning*, IEEE Transactions; Sep., 1983.
Tsang et al., *Gigabit Density Recording*, IEEE Transactions; Sep., 1990.

*Primary Examiner*—Louis J. Casaregola
*Attorney, Agent, or Firm*—Antonelli, Terry, Stout & Kraus

[57] ABSTRACT

A magnetic recording data storage system includes a magnetic recording medium having pits formed therein, the pits defining recording tracks on the magnetic recording medium and being arranged in a staggered manner relative to respective center lines of the recording tracks, a magnetic head including an inductive element for recording data on the recording tracks and a magnetoresistive element for reproducing data from the recording tracks, one of (1) a unit for magnetically producing a signal from the pits, and (2) an optical unit for optically producing a signal from the pits, the optical unit including a laser for illuminating the pits, servo means for positioning the head on the recording tracks based on the signal produced from the pits, the servo means including a dual-stage actuator including a rough movement portion and a fine movement portion.

12 Claims, 8 Drawing Sheets

MAGNETIC RECORDING DATA STORAGE SYSTEM

BACKGROUND OF THE INVENTION

The present invention relates to an information recording system using a magnetic recording method, and in particular to a magnetic recording apparatus that is capable of operating at 20 times or more than the current recording capacity of the information recorded on the media.

The fact that it is possible to record magnetically information at densities of more than 1 Gigabits per square inch was announced by IBM in 1990. This announcement (for example, Ching Tsang et al. "Gigabit density recording using dual-element MR/inductive heads on thin-film disks", IEEE Transactions on Magnetics, Vol. 26, No. 5 (September 1990), pp. 1689-1693) indicates, based on the results of measuring the error rate, to what extent the recording density can be increased when the flying height of the head is reduced to below 0.05 microns when a dual element head comprising an inductive head in the recording portion and a magnetoresistive head in the reproduction portion is used in combination with a sputtered thin film recording medium, but does not carry out the tracking of the head, etc. Hence, it does not operate as a recording apparatus.

In addition, the discrete type media structure in which a groove is provided on both sides of the recording track in the medium has been published in, for example, S. E. Lambert et al. "Reduction of edge noise in thin film metal media using discrete tracks", IEEE Transactions on Magnetics, Vol. 25, No. 5 (September 1989), pp. 3381-3383. The purpose of this paper is to reduce the media noise that occurs at the edge of the recording track and deals with experiments on media with recording track widths of around 10 microns. However, they have concluded that there is no effect of making the medium have a discrete structure as far as the signal to noise ratio (S/N ratio) and the error rate are measured.

On the other hand, known examples of providing several sectors on the information recording surface and determining the head position based on this have been shown in, for example, H. Nakanishi et al., "High track density head positioning using sector servos", IEEE Transactions on Magnetics, Vol. MdG-19, No. 5 (September 1983), pp. 1698-1700. In this publicly known example, there is the problem that it is necessary to form newly the pattern for determining the head position on the medium recording surface and hence the data storage region gets reduced by a corresponding amount.

Further, an optical servo equipment for controlling the position of the magnetic head is described in Japanese Patent Laid-Open No. 59-8172 (corresponding to U.S. Pat. No. 4,633,451). In this prior art, the position of the head is determined by providing a layer of different optical reflectivity on top of the medium recording layer and reflecting a laser beam by this material layer. Therefore, the distance between the magnetic head and the medium recording layer increases and becomes extremely disadvantageous for carrying out high density recording.

SUMMARY OF THE INVENTION

An object of this invention is to provide a magnetic recording apparatus that can suit the high density recording of the future in which the information recording capacity of the recording medium exceeds 1.2 Gigabits per square inch, and in particular, to provide a magnetic recording apparatus that solves the following technical problems for realizing such a magnetic recording apparatus.

(1) The shift in the head position increases with the narrowing of the track for recording information. To eliminate the noise component due to this shift in the head position.

(2) To avoid the reduction in the data storage region due to providing the pattern for head positioning.

(3) To eliminate the rise in the reproduction signal spectrum in the high frequency range.

The above problems are solved by carrying out high accuracy head tracking at the time of information recording and reproduction using a magnetic servo method or an optical servo method based on discrete grooves provided on both sides of the recording track of the medium or pits provided in a staggered arrangement centered around the recording track, and by using a low noise dual element head that uses an inductive element for recording the information and a magnetoresistive element for reproducing the information.

Further, it is preferable that the positioning of the head on the recording medium is done using a known dual stage actuator constructed of a coarse motion portion and a fine motion portion.

It will be possible not to consider the noise jitter component due to the shift in the head position during recording and reproduction if high accuracy head tracking is carried out using a magnetic servo method or an optical servo method based on the grooves or pits provided regularly on the recording medium comprising a longitudinal magnetic recording medium or a perpendicular magnetic recording medium. As a consequence, it is possible to make small the S/N ratio necessary for the operation of the apparatus and to increase correspondingly the linear recording density and the track density.

Further, since it will not be necessary to record tracking information on the recording surface of the medium if the head positioning is carried out using the grooves provided on both edges of the recording track or the pits provided in a staggered arrangement about the center of the recording track, it will be possible to expand the effective area necessary for recording the information on the recording surface. In other words, as is known in the conventional sector servo method, it is necessary to divide the recording surface into several sectors and to record only the several items of information for detecting the head position in these sectors, but this need is not present in the present invention. Further, in the conventional method, the recording surface is divided into several sectors after assembling the head and the media in the equipment and each equipment was being formatted before shipment but the need for this formatting is eliminated in the present invention and it becomes possible to form easily the pattern for positioning during the process of preparing the medium.

On the other hand, since it will be possible to reduce the inductance if a low noise magnetoresistive element is used for the reproduction head, it will be possible to suppress the rise of the reproduced signal spectrum in the high frequency range. In this case, it will be possible to increase the effect of the equalizer for carrying out signal processing and hence it will be possible to reduce the S/N ratio necessary for equipment operation before signal processing.

DESCRIPTION OF THE PREFERRED EMBODIMENTS

Embodiment 1

Figure 1:
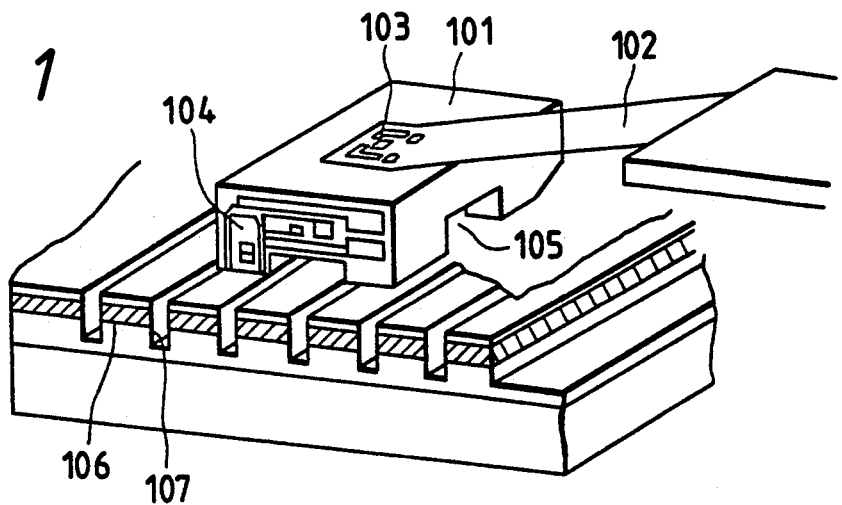
FIG. 1 is a schematic view of the head and medium in one preferred embodiment of the present invention.

A preferred embodiment of the present invention is described below using the figures. First, the structure of the magnetic signal recording and reproduction portion comprising a magnetic head and a recording medium is shown in FIG. 1. The head slider 101 is pressed onto the medium with a constant weight by the load arm 102 and the gimbal 103. The head slider floats on the medium along with the rotation of the disk shaped medium. The semiconductor laser 104 for detecting the head position information is mounted on the recording and reproducing head at the air outflow end of the head slider. This semiconductor laser is made from GaAlAs, has a wavelength of 780 nm, and an output power of about 2 mW. Further, the light emitting point of the laser is mounted at a slightly retracted position from the floating surface of the head slider. Also, the central part of the slider rail has a groove 105 formed in it at a direction perpendicular to the rail. The medium has the discrete structure in which grooves 107 are provided on both sides of the recording tracks 106 with the depth of these grooves being more than the depth of the recording layer. The laser light beam excited by the semiconductor laser is designed so that it impinges on the one track where the recording or reproduction is being performed and the two grooves on either side of that track.

Figure 2:
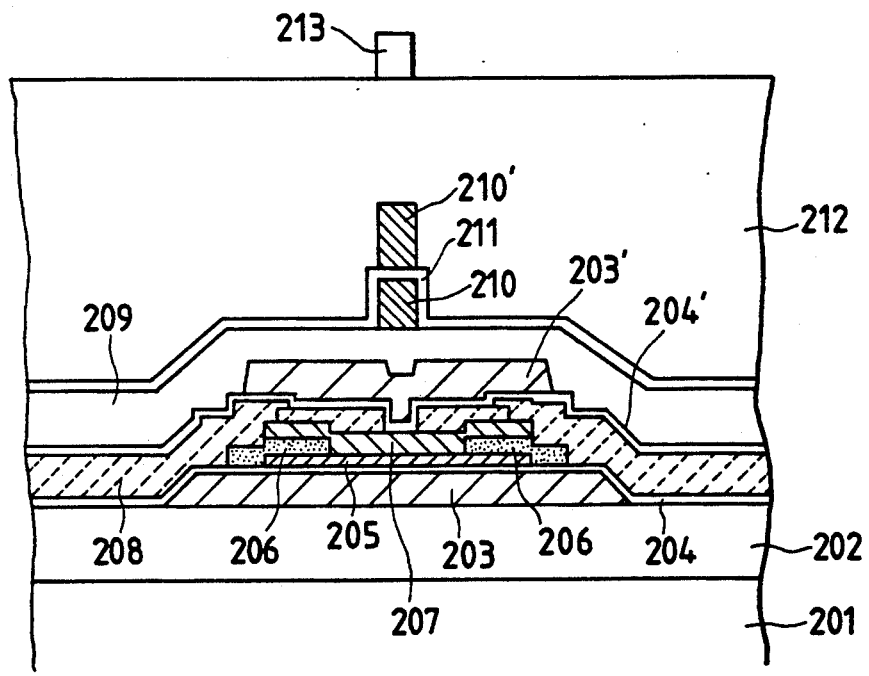
FIG. 2 is the plan view of the recording and reproducing portion of the magnetic head as seen from the air bearing surface in one preferred embodiment of the present invention.

FIG. 2 shows the structure of the recording and reproduction portion of the head as seen from the air bearing surface. The slider material 201 is zirconia ($ZrO_2$), and an alumina layer 202 is formed on this zirconia by sputtering. The shield materials 203 and 203' are Co-based amorphous alloys whose relative permeability can be changed as needed. The gap layers 204 and 204' are alumina, and the two ends of the magnetoresistive element (MR element) 205 are formed by FeMn films 206 that cause an exchange coupling with the MR element. By providing this FeMn film, it is possible to completely suppress Barkhausen noise. Niobium is used for the shunt film 207, and the spacing between the upper shield layer 203' and the lower shield layer 203 is 0.4 microns or less. The separation layer 209 that separates the recording head and the reproduction head is made of alumina and its surface is smoothed by an etchback processing. Multi-layer films of Fe/$B_4C$ with a saturation flux density of 2.0 T are used for the poles 210 and 210' of the recording head. The thicknesses of the upper magnetic pole layer and the lower magnetic pole layer are 2 microns each and the thickness of the gap layer 211 is 0.4 microns. The alumina protective layer 212 is provided on the recording head. In the present preferred embodiment, although the track width of the recording head, that is, the width of the upper magnetic pole 210' has been set at 2.2 microns, if the track width is set to a value smaller than this value it will be difficult to control the track width using the current photolithographic technology. It is possible to realize a recording head with a track width of less than 2.2 microns by irradiating a focused ion beam (FIB) from the air bearing surface. In FIG. 2, the numeral 208 indicates the lead wires and the numeral 213 indicates the light emitting portion of the semiconductor laser.

The alumina layer 202 is formed to smooth the surface of the substrate and to avoid the characteristics of the elements formed on it from becoming deteriorated, and the shield materials 203 and 203' are required to improve the resolution of reproduction by the MR head, that is, to ensure that the reproduced signal does not get attenuated up to the high density region. By varying the relative permeability of the shield materials 203 and 203', it will be possible to optimize the reproduction output and the reproduction resolution In general, the reproduction output decreases and the reproduction resolution increases when the relative permeability is increased. On the other hand, the opposite effect will be present when the relative permeability is decreased. The gap materials 204 and 204' prevent electrical conduction between the MR element and the shield material The poles 210 and 210' of the recording head have the multiple layer structure consisting of four alternating layers each of a 45 nm thick Fe layer and a 5 nm thick $B_4C$ layer.

Figure 3:
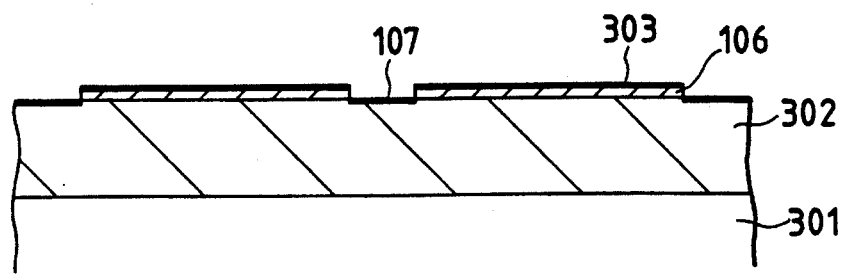
FIG. 3 is a cross-sectional view of the recording medium in one preferred embodiment of the present invention.

FIG. 3 shows the cross-sectional structure of the medium. The substrate is made of a glass disk 301 of diameter equal to 3.75 inches or less. A chromium layer 302 and the recording layer which is a Co-based layer 106 made of an alloy of 78.0 at % Co- 14.5 at % Cr-7.5 at % Pt are formed by sputtering on top of this glass disk, and finally a carbon protective film 303 is formed at the very top. The thickness of the recording layer 106 is 40 nm or less and the thickness of the carbon protective layer 303 is around 10 nm. After the Cr layer 302 and the recording layer 106 are formed, the grooves 107 are formed by photolithography. The recording layer 106 is completely split by these groves 107. Further, the depth of the grooves 107 is set to be more than the depth of the recording layer 106. The carbon protective film 303 is formed by sputtering after the grooves 107 are formed. It is sufficient if the recording layer 106 is a continuous film of thickness of 40 nm or less, and although there is no particular need to set a lower limit on its thickness, a thickness of 10 nm or more would be required at the current technology levels to obtain a continuous film, and hence it is preferable to set the lower limit of the thickness of the recording layer 106 to 10 nm or more at the present time. The thickness of the recording layer 106 in the present preferred embodiment was set at 30 nm.

Figure 4:
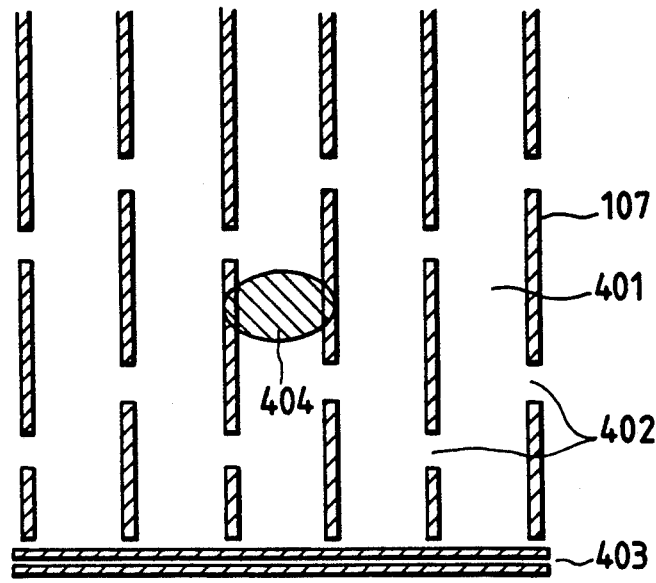
FIG. 4 is a plan view of the two dimensional shape of the recording medium and the shape of the laser spot that is impinged on the medium in one preferred embodiment of the present invention.
Figure 5:
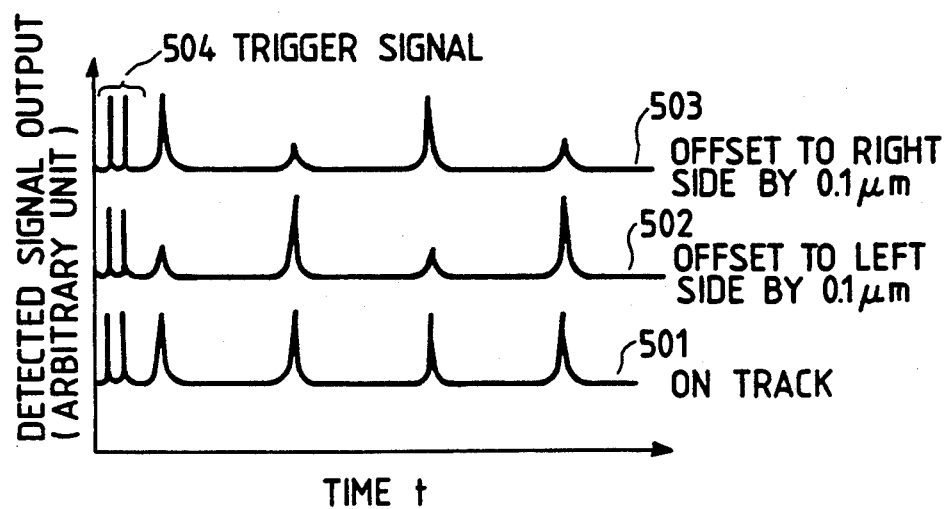
FIG. 5 is a graph of the detected signal output in one preferred embodiment of the present invention.
Figure 6:
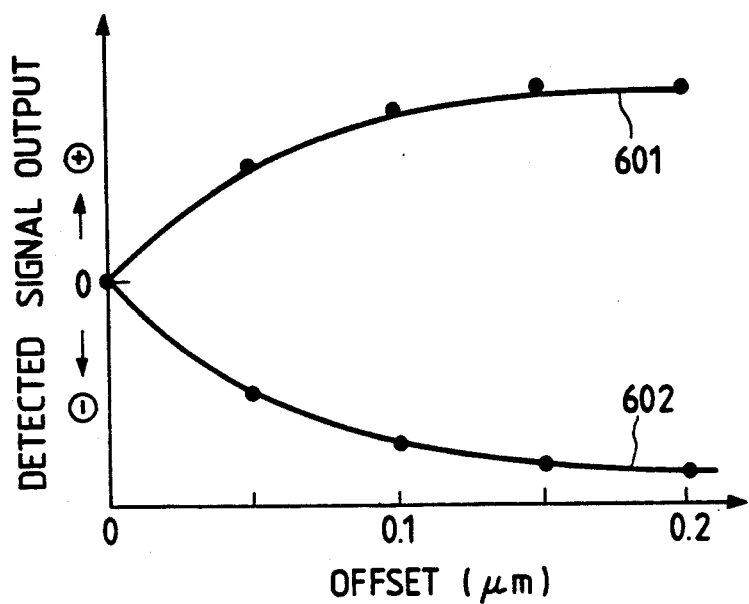
FIG. 6 is a graph showing the relationship between the detected signal output and the amount of head offset in one preferred embodiment of the present invention.

FIG. 4 is a figure for describing the two dimensional structure of the discrete medium and the region where the laser beam is impinged. The width of the recording track 401 is 2.0 microns and the width of the grooves 107 is 0.5 microns in this preferred embodiment. Further, the grooveless regions 402 are provided alternatingly on the left and right of a track on its two sides. Also, at one location along the circumferential direction of the medium is provided the region 403 for triggering the tracking signal obtained by laser irradiation. Providing such a region is well known in this technology field. The shape of the laser spot 404 that is impinged on the medium is an ellipse with a major axis of 3 microns and a minor axis of 1 micron with its major axis along the width of the track. The diameter of the laser spot can be made even smaller by using a semiconductor laser of even shorter wavelength. FIG. 5 is the result of plotting the variation of the detection signal output against the time axis when the head is set exactly above the recording track with an accuracy of +0.05 microns, when it is offset to the right of the track by 0.1 microns, and when it is offset to the left of the track by 0.1 microns. In the on track condition, pulse outputs with equal magnitudes will be detected when the grooveless regions provided on the left and right sides of the track are passed over as shown by the curve 501. On the other hand, when the head is offset to the left or the right of the center of the track, the signal output detected will consist of pairs of large and small amplitudes as shown by the curves 502 and 503. The tracking information of the head can be obtained by detecting the differences in the successive pairs of signals after detecting the trigger signals 504. In other words, as is shown in FIG. 6, a positive signal proportional to the offset will be obtained as shown in the curve 601 if the head is offset to the right of the track, and a negative signal proportional to the offset will be obtained if the head is offset to the left of the track as shown in the curve 602. Also, if there is no offset this detected signal difference output will be zero. It is possible to carry out the correction of the position of the head on the track by controlling the drive circuit of the mechanism for determining the head position based on the variations in this output.

In the following, further detailed descriptions will be given for the two dimensional structure of the discrete medium shown in FIG. 4.

The relationship expressed by Equation (1) below should be satisfied when the direction of the major axis of the laser spot is used for determining the position of the head, with the pitch of the discrete grooves 107 being expressed by $\alpha$, the width of the grooves 107 being expressed by $\beta$, the length of the major axis of the laser spot that is impinged on the surface of the medium being expressed as X, and the length of the minor axis of the laser spot being expressed as Y:

$$0 < \alpha - \beta < X \tag{1}$$

where, $$\alpha \leq 2.5 \text{ microns.}$$

Further, when the direction of the minor axis of the laser spot is used for determining the position of the head, the quantity X in Equation (1) should be replaced by the quantity Y.

When the position of the head is determined according to the present invention, in order to maintain the positioning accuracy at a high accuracy of better than 0.05 microns, the grooveless region 402 needs to be provided at more than 1000 locations on each circumference of the disk shaped medium. As a consequence, in order to maintain this position determining accuracy on a circumference or tack of radius r mm, the length L of each discrete groove 107 will have to satisfy the following condition:

$$L < 2\pi r / 1000 \text{ (mm)} \tag{2}$$

Further, the lower limit value of the length L of the groove 107 is determined by the accuracy of the process for forming the grooves, and is at best about 0.3 microns at the present time.

Further, when the length of the groove is denoted by L and the length of the grooveless region is denoted by L', the distance X' from the center of one of the grooveless regions 402 among two neighboring grooveless regions 402 along the width direction of the track to the point obtained by projecting in a perpendicular direction the center of the other neighboring grooveless region on a line from the center of the first grooveless region in the direction of the length of the track should satisfy the following relationship:

$$L' < X' < L \tag{3}$$

When the laser spot is impinged on the discrete medium, the detection of the position signal can be done by the known method of monitoring the semiconductor laser oscillation voltage which varies depending on the presence or absence of the discrete groove 107 when the semiconductor laser is driven by a constant current. Further, it is also possible to detect the position signal by providing a photodetector behind the semiconductor laser and monitoring the intensity of the reflected light which varies depending on the presence or absence of the discrete groove 107.

Figure 7:
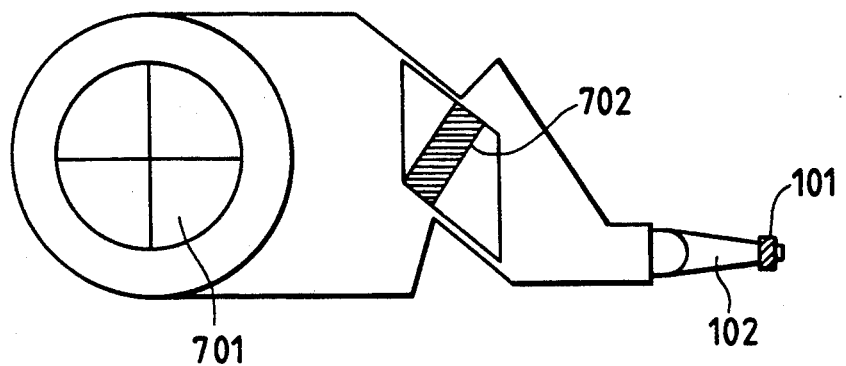
FIG. 7 is a schematic plan view of the dual stage actuator in one preferred embodiment of the present invention.
Figure 8:
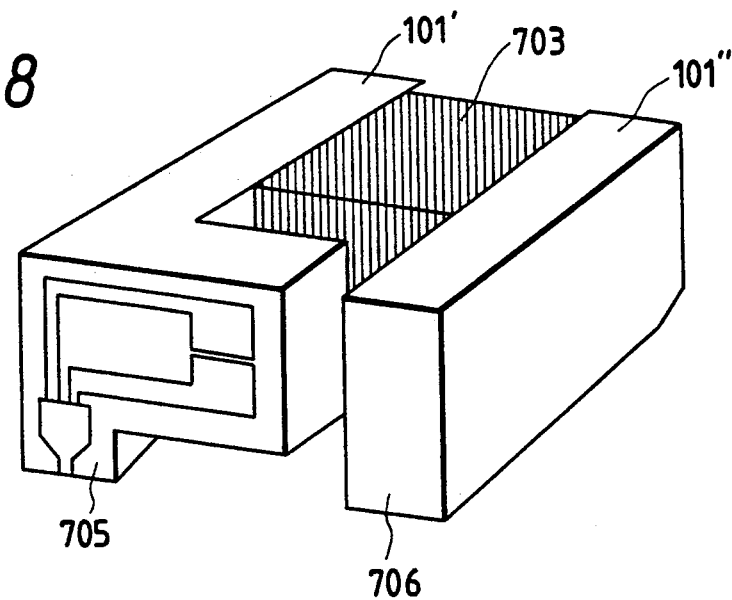
FIG. 8 is a schematic view of the actuator for fine movement in which a piezoelectric element is built into the slider in one preferred embodiment of the present invention.

FIG. 7 is a diagram showing the construction of the actuator for carrying out the movement of the head position. In this preferred embodiment, the entire actuator is being moved by the rotary motor indicated by the numerals 701. However, it is neither possible to accurately move the head slider on top of any required track nor possible to make it follow the track in the high frequency region using only this rotary motor. In this preferred embodiment, in order to aid the mechanical accuracy of the rotary motor and to increase the tracking accuracy, a two-stage variable type actuator is used in which a piezoelectric element 702 is incorporated at the tip of the actuator. The tip of the actuator is moved finely using the expansion and contraction of this piezoelectric element, thereby carrying out the high accuracy tracking of the head. When an actuator of this construction is used, it is possible to carry out further high speed and high accuracy tracking by increasing the mechanical rigidity of the guide arm 102. In this preferred embodiment, we have chosen stainless steel as the material for the guide arm 102. It is possible to increase the rigidity of the guide arm either by increasing its thickness, or by embedding resin within the guide arm. An effect similar to that of providing a piezoelectric element 702 at the tip of the actuator can also be obtained by inserting a piezoelectric element 703 between two separated sliders 101' and 101'' and changing the spacing between two slider rails 705 and 706 as shown in FIG. 8. Further, the fine movement using the piezoelectric elements 702 and 703 can be performed in the frequency range of 200 Hz to 2 kHz, and the rough movement can be performed by the rotary motor in the frequency range of less than 200 Hz. The two-stage variable actuator has been known, for example, in Japanese Patent Laid-Open No. 59-96571.

As has been described earlier, although the depth of the discrete grooves 107 is made more than the depth of the recording layer 106, the permissible range of this depth should be such that the recording medium does not become undesirably weak.

Figure 9:
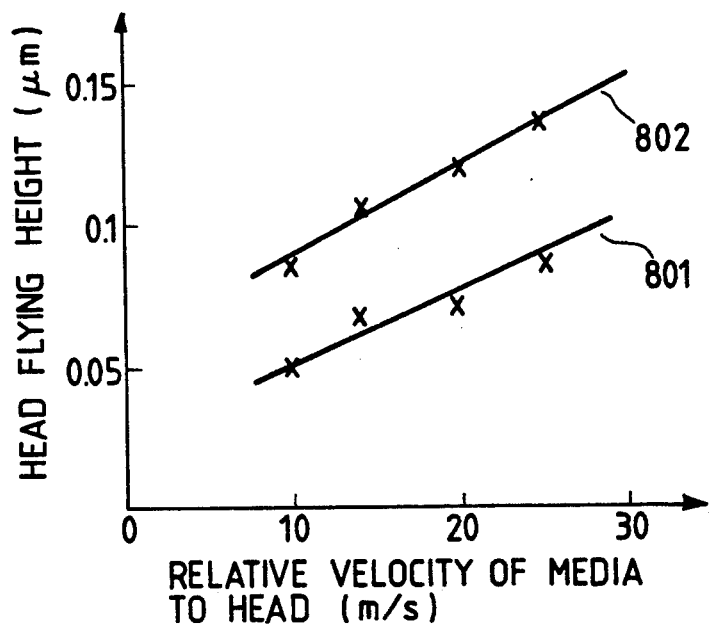
FIG. 9 is a graph showing the flying characteristics of the head slider in one preferred embodiment of the present invention.
Figure 10:
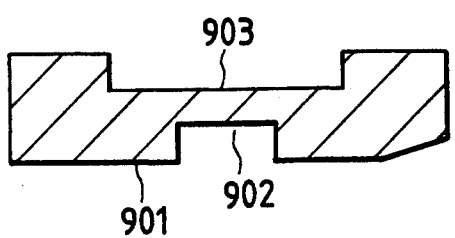
FIG. 10 is a cross-sectional view showing the sectional shape of the head slider in one preferred embodiment of the present invention.

FIG. 9 and FIG. 10 are diagrams for explaining the slider shape for decreasing the amount of flying of the head and its effect. To begin with, FIG. 10 is a drawing of a slider similar to the head slider 101 in FIG. 1 and to the slider material 201 of FIG. 2 as seen from the side. In this figure, 901 is the air bearing surface and 903 is the portion where the gimbal is affixed, with the distance between the air bearing surface 901 to the the gimbal affixing portion 903 being 0.86 mm. A groove 902, as is known in the prior art, is formed at almost the center of the air bearing surface 901 in a direction perpendicular to the slider rail. In this preferred embodiment, the width of this groove 902 has been set at 0.9 mm and its depth has been set at 0.5 mm. It is possible to vary the flying characteristics by varying the width of this groove. However, there is almost no variation with respect to the depth of this groove as long as it is more than 0.1 mm. FIG. 9 the result of comparing the flying characteristics of this slider with that of a normal slider in which the groove 902 has not been formed. The strength of the spring of the gimbal is 10 g in either case in this measurement and the rail width is 400 microns. Further, it is possible to vary the head-to-medium relative speed by varying the rotational speed of the disk. In FIG. 9, the curve 801 is the result of measurement for the slider with groove in this preferred embodiment and the curve 802 is the result of measurement for a ordinary slider. From these results, it is evident that it is possible to reduce the flying height of the head, even if the width of the slider rail is not decreased, by forming a groove in the center of the slider rail. A flying height of 0.05 microns can be achieved at a head-to-medium relative speed of 10 m/s with the slider shape of this preferred embodiment. The above groove has been described further, for example, in Japanese Patent Publication No. 63-19950 and Japanese Patent Publication No. 63-19951.

Figure 11:
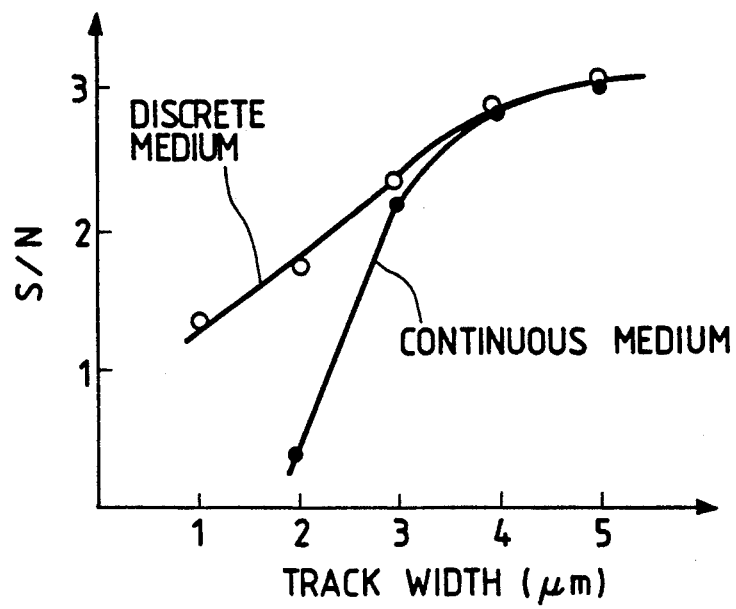
FIG. 11 is a graph for explaining the effect of making the medium have a discrete structure in one preferred embodiment of the present invention.

FIG. 11 is the result of investigating how the dependence of the S/N ratio gets improved by making the medium have a discrete structure with separation between tracks The S/N ratio is expressed along the vertical axis in which the noise includes the head noise, the amplifier noise, and the medium noise. The frequency bandwidth is set at 36 MHz and the flying height of the head is 0.05 microns when the head-to-medium relative speed is 10 m/s. The same head is used for recording and reproduction which includes a separate recording head and a separate reproduction head using an MR element. The guard band between the recording tracks does not depend on the track width and is set at 0.5 microns in both types of media. The recording density is 100 kBPI (Kilobits per inch). In the medium in which the region between the tracks is continuous, since the tracking is being done using magnetic signals, there is the problem that in this case the reproduction signal level becomes smaller as the track width is decreased and hence the tracking accuracy becomes poor. In the case when an MR head is used for reproduction, the tracking accuracy is more than $\pm 0.1$ microns up to a track width of 4 microns. However, as the track width becomes smaller the accuracy becomes poorer due to the decrease in the reproduced output. As a consequence, in the medium in which the region between the tracks is continuous, the effect of the noise jitter due to offset in the head position becomes larger and the S/N ratio becomes lower and goes below 1 at a track width of 2 microns. On the other hand, in the case of the discrete medium with a groove at the edges of the recording track, the tracking accuracy is constant independent of the track width. Hence the accuracy is more than $+0.1$ microns even up to a track width of 1 micron. Therefore, it is clear that when a discrete medium is used the decrease in the S/N ratio is smaller at track widths of less than 4 microns and is more than 1 even when the track width is decreased to 1 micron. From this result, it is evident that the result of using a discrete track structure becomes important at track widths of less than 2 microns.

Figure 12:
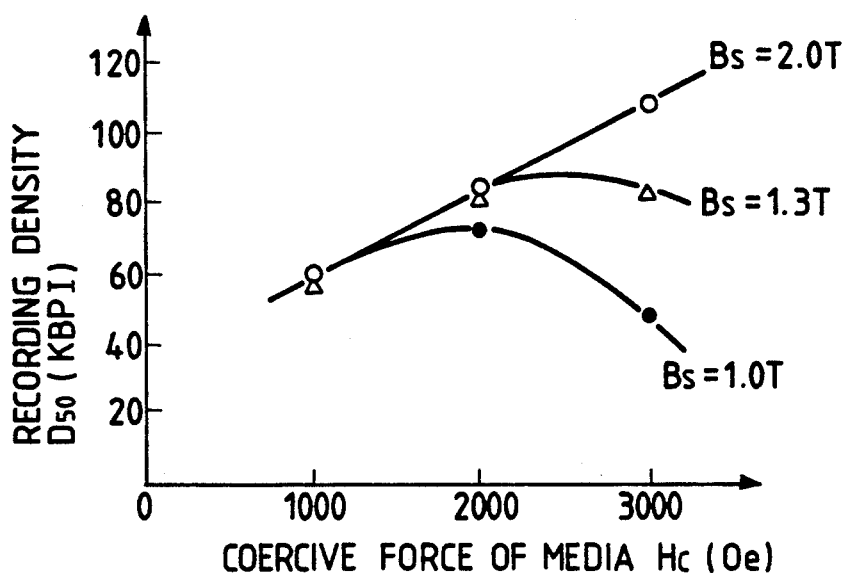
FIG. 12 is a graph for explaining the saturation magnetic flux density necessary for the recording head pole in one preferred embodiment of the present invention.

FIG. 12 is a figure for explaining how high a saturation magnetic flux density Bs is required for the magnetic poles of the recording head due to changes in the coercive force of the medium. The thickness of the magnetic layer film of the medium is 0.04 microns and the thickness of the carbon protective layer is 0.02 microns during this measurement. The head-to-medium relative speed during recording and reproduction is 20 m/s and the flying height of the head is 0.075 microns. Three types of mediums were used during the measurement with coercive forces of the mediums being 1000, 2000, and 3000 Oe. The medium with a coercive force of 1000 Oe is Co-Ni, the material with a coercive force of 2000 Oe is Co-Cr-Ta, and the medium with a coercive force of 3000 Oe is Co-Cr-Pt and the magnetic nature of these materials such as the saturation magnetization, squareness, switching field distribution (SFD), etc., is the same apart from the coercive force obtained from the hysterisis curve. Further, the head used for the measurements is a thin film head of the induction type with the upper and lower magnetic pole thicknesses being both 2.0 microns, the gap layer thickness being 0.4 microns, and the structure of the tip of the magnetic poles is the same. However, the magnetic pole materials used are permalloy with a saturation magnetic flux density Bs of 1.0 T, an amorphous alloy of CoTaZr with a saturation magnetic flux density Bs of 1.3 T, and a multiple layer structure of Fe/B$_4$C (the same multiple layer structure as that of the magnetic poles 210 and 210' in FIG. 2) with a saturation magnetic flux density Bs of 2.0 T. Further, the same magnetoresistive effect type of head with a shield spacing of 0.3 microns is used for reproduction in all the cases. From the result of FIG. 12, it is clear that the resolution becomes smaller when the coercive force of the medium becomes higher, thereby making the recording capacity of the head to become insufficient. From this result it is clear that if the Bs of the head magnetic pole is 2.0 T, the resolution does not get decreased even when the coercive force of the medium is increased to 3000 Oe and the recording density D$_{50}$ increases to more than 100 kBPI under these measurement conditions. From this result, it is evident that it is necessary to increase the saturation magnetic flux density Bs of the recording head magnetic pole along with the increase in the coercive force of the medium in order to increase the linear recording density, and Bs has to be 2.0 T or more to increase the recording density D$_{50}$ to more than 100 kBPI.

Figure 13:
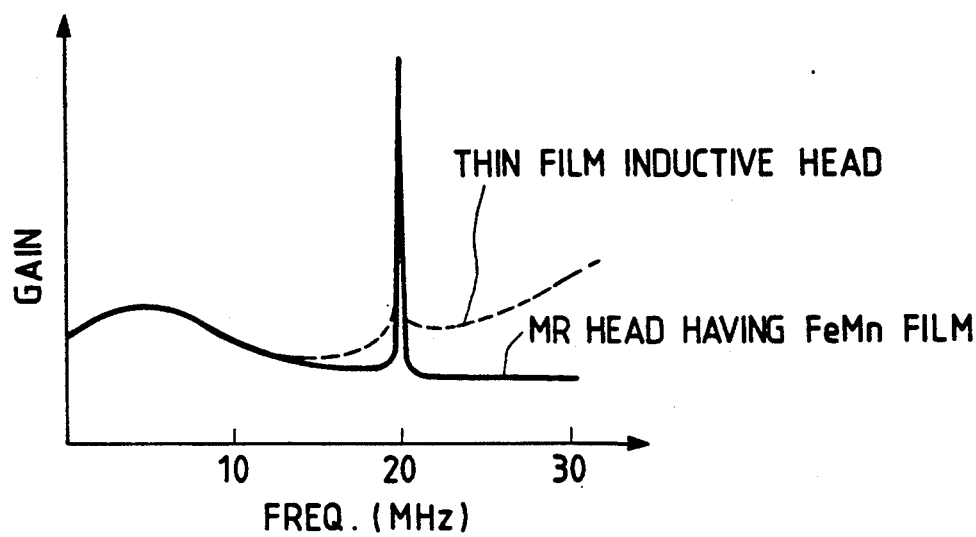
FIG. 13 is a graph comparing the spectrum of the reproduced output waveform when the reproduction is done using an MR head with that using an inductive type thin film head in one preferred embodiment of the present invention.
Figure 14:
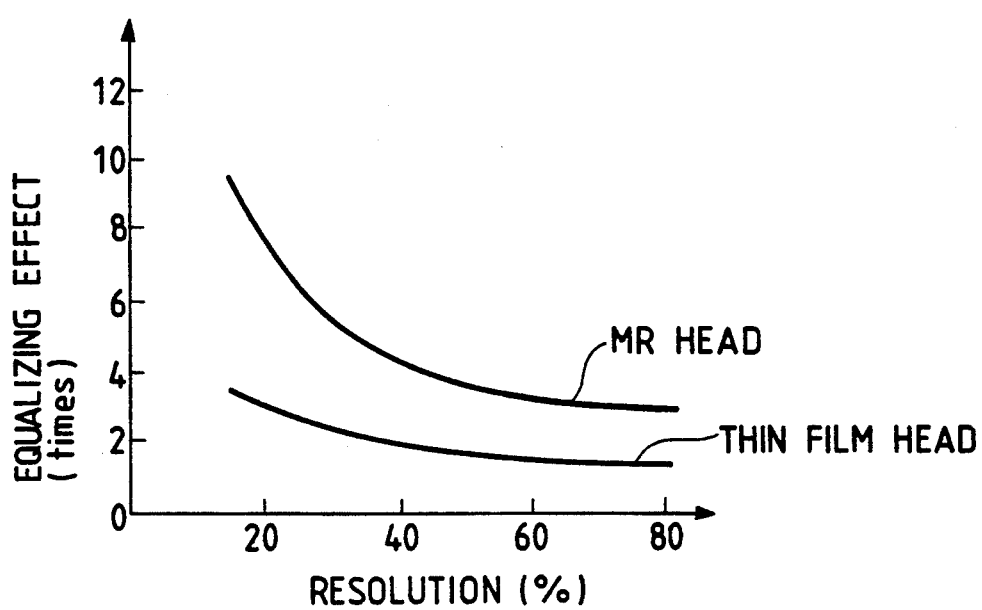
FIG. 14 is a graph explaining the effect of an equalizer in one preferred embodiment of the present invention.

FIG. 13 shows the result of measuring using a spectrum analyzer the signal reproduced using an MR head with an FeMn film and the signal reproduced using the conventional thin film inductive head. The number of turns of the coil in the thin film inductive head is 24 and the inductance is 0.4 μH. On the other hand, the inductance of the MR type head is less than or equal to 0.1 μH. From FIG. 13 it is clear that although the spectrum of the signal reproduced by the MR head becomes constant beyond 15 MHz, the base line of the spectrum rises when the frequency exceeds 15 MHz in the case of the thin film inductive head. The cause for this is considered to be the increase in the inductance with the increase in the frequency. Although a known class 4 type partial response equalizer is used to preform signal processing on the reproduced signal in this preferred embodiment, it is necessary to make narrow the width of the raw waveform reproduced by the head. In other words, the high frequency components of the spectrum will be enhanced. Hence, if there is a rise in the higher frequency side of the spectrum of the signal reproduced by an inductive head as shown in FIG. 13, the S/N ratio after passing through the equalizer will be restricted. FIG. 14 is the result of comparing the effect of the equalizer in this preferred embodiment for the MR head and the thin film inductive head. From this result, it is clear that it is possible to increase greatly the effect of the equalizer by reproducing the signal using and MR head with low inductance an no variations in the reproduced waveform. The MR heads used can be of the shunt biasing type or the soft film biasing type.

Figure 15:
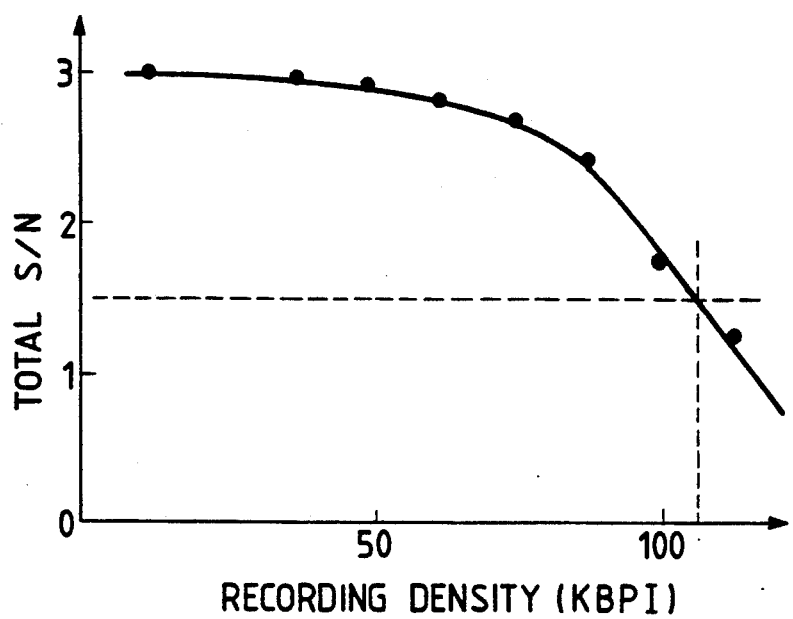
FIG. 15 is a graph explaining the measured recording density characteristics when a combination of an MR head and a sputtered medium is used in one preferred embodiment of the present invention.
Figure 16:
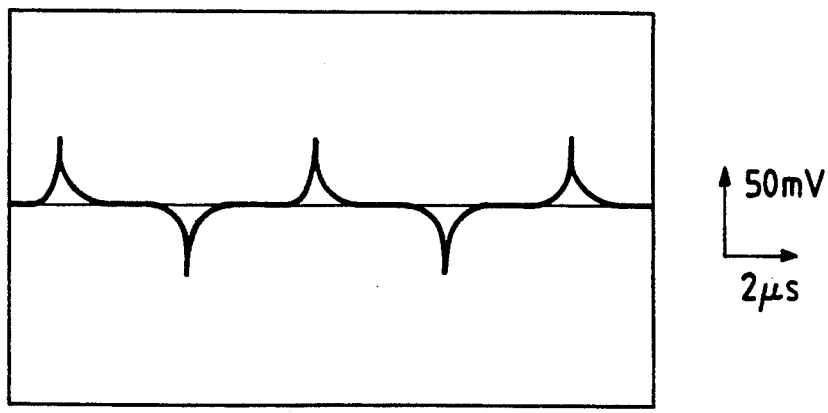
FIG. 16 is a graph explaining the measured independent reproduction waveform when a combination of an MR head and a sputtered medium is used in one preferred embodiment of the present invention.

FIG. 15 and FIG. 16 are the result of measuring the recording density characteristics. The S/N ratio of the head output before passing through the equalizer is plotted along the vertical axis in FIG. 15. Here, the noise N is the total noise that includes the head noise, the amplifier noise, and the medium noise. The frequency bandwidth has been set at 36 MHz, the head-to-medium relative speed is 10 m/s, and the flying height of head is 0.05 microns. The shield spacing of the head used for measurement is 0.28 microns and the track width is 2.0 microns. The height of the MR element is 3 microns and the thickness is 15 nm. The reproduced output becomes maximum when the sense current is 20 mA, and also the symmetry of the independent wave is also good as shown in FIG. 16. The medium used is a discrete type of medium with a track width of 2.0 microns and a groove width of 0.5 microns. The coercive force is 1600 Oe and the film thickness of the magnetic layer is 40 nm. When an 8/9 code encoder, a class 4 partial response equalizer, and a Viterbi detection method are combined, since the bit error rate becomes lower than or equal to $1/10^9$ if the S/N ratio of the head output is 1.5 or more, it has been confirmed from the result of the previous investigations that the equipment can operate satisfactorily. Therefore, as can be seen from FIG. 15, it is possible to carry out recording and reproduction at a linear recording density of up to 120 kBPI the head and medium system used here. From this result, it is clear that using this method it is possible to realize a track density of 10 kTPI (Kilotracks per inch) and a linear recording density of 120 kBPI, that is, 1.2 Bigabits per square inch.

Although the groove width was 0.5 microns in this preferred embodiment, it is possible to reduce the groove width up to 0.3 microns with the current photolithograpic processes. Further, although the track width of the head in this preferred embodiment was 2.0 microns, it has been confirmed that a quite satisfactory S/N ratio can be obtained even when the track width is reduced up to 1.0 microns. In this case, the track density will be 19.5 kTPI and the linear recording density will be 120 kBPI. In other words, it is possible to increase the recording density up to 2.34 Gigabits per square inch using this method. Further, although a longitudinally magnetized recording medium is being used in the above preferred embodiments, it is also possible to increase the linear recording density by using a perpendicularly magnetized recording medium. For example, when a perpendicularly magnetized medium consisting of a 0.15 microns thick Co-Cr layer with a coercive force of 1000 Oe and a 0.08 microns thick Ni-Fe (permalloy) underlayer with a coercive force of 300 Oe and a magnetoresistive type of head using the soft film biasing method are combined, the recording density that can be achieved during reproduction with a head track width of 1 micron (head output S/N ratio of 1.5 or more) increases to 200 kBPI. In this case, the area recording density that can be realized will be about 4 Gigabits per square inch.

Embodiment 2

Figure 17:
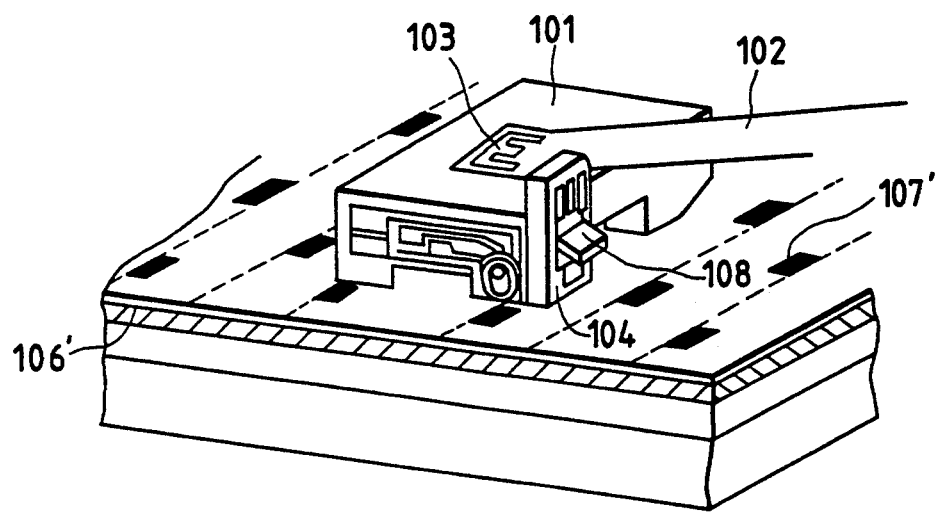
FIG. 17 is a schematic diagram showing the head and medium system in one preferred embodiment of the present invention.
Figure 18:
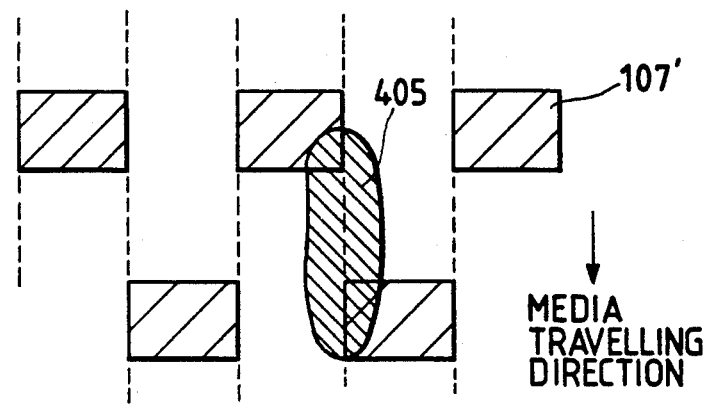
FIG. 18 is a plan view showing the two dimensional shape of the recording medium and the shape of the laser spot that is impinged on the medium in the embodiment of the present invention shown in FIG. 17.

The second preferred embodiment of the present invention is shown in FIG. 17. In this case, the semiconductor laser 104 is mounted on the side surface of the slider. The medium has a structure in which pits 107' are provided in a staggered arrangement around the center of the recording tracks. In this case, the positioning of the head is made based on these pits. The numeral 108 is the photodetector. FIG. 18 is a diagram showing the two dimensional structure of the recording medium and the shape of the laser spot that is impinged on the medium. In this case, the shape of the laser spot differs from that in the preferred embodiment 1 and is an ellipse that has its major axis in the bit direction with the length of the major axis being 3 microns and the length of the minor axis being 1.5 microns. Further, the track pitch is determined by the lateral width of the pits 107' that are arranged in a staggered manner around the center of the track. In the present invention, the track width of the head being used for recording and reproduction is at most 2 microns. Therefore, it is sufficient if the lateral width or diameter of the pits is 3 microns or less considering the writing extension in the lateral direction by the recording head or the off track characteristics of the reproduction head. In the present preferred embodiment, rectangularly shaped pits are being used with a width of 1.5 microns and a length of 1 micron. In order to carry out tracking using this method, since it is sufficient if the distance from the recording and reproduction portion of the head to the laser light emitting point, there is no need to place the semiconductor laser on the recording and reproduction portion of the magnetic head. The structure of the recording and reproduction head and the characteristics of the recording medium are the same as in the preferred embodiment 1. Further, the tracking accuracy will be more than ±0.05 microns if the number of the staggered arrangement pits is more than 1000 in one circumference of the track. Further, in this preferred embodiment, we set the track width at 1.5 microns for recording and 1 micron for reproduction. Since the track pitch is 1.5 microns, the track density will be 17 kTPI and the linear recording density will be 120 kBPI since the head and medium system as well as the signal processing method are the same as in the preferred embodiment 1. Therefore, it is possible to realize a recording density of 2 Gigabits per square inch. It is possible to further increase the recording density by improving the head and the medium, use of the perpendicular recording method, and decreasing the flying height.

In this preferred embodiment, the recording layer 106' is capable of reducing noise and has a two layer structure consisting of 74.2 at % Co - 4.7 at % Cr - 21.1 at % Pt alloy and another layer of 74.2 at % Co - 14.5 at % Cr - 8.4 at % Pt - 2.9 at % Si. The thicknesses of these two layers are both equal to 15 nm and the total thickness is 30 nm. The media noise in this medium decreases by about 30% with respect to the media noise in preferred embodiment 1.

In the following, the two dimensional structure of the medium having the pits 107' shown in FIG. 18 will be described in further detail.

When the distance between the lines parallel to the length of the track (in the direction of the circumference of the disk) and passing through the centers of neighboring pits 107' along the width direction of the track (that is, along the radial direction of the disk) is denoted by $\alpha'$, the width of the pits 107' (the maximum value of the pit width in the radial direction of the disk) is denoted by $\beta'$, the length of the major axis of the elliptical laser spot that is impinged on the surface of the medium is denoted by X, the length of the minor axis of the elliptical laser spot is denoted by Y, and when the minor axis direction of the laser spot is used for positioning the head, the relationship given by Equation (4) below should be satisfied.

$$0 < \alpha' - \beta' < Y \qquad (4)$$

where, $\alpha' \leq 2.5$ (microns).

Further, when the major axis direction of the laser spot is used for the head positioning, the quantity Y in Equation (4) should be replaced by the quantity X.

When the position of the head is determined according to the present invention, in order to maintain the positioning accuracy at a high accuracy of better than 0.05 microns, the pits 107' need to be provided at more than 1000 locations on each circumference of the disk shaped medium. As a consequence, in order to maintain this position determining accuracy on a circumference or tack of radius r mm, the periodicity $\lambda$ of the pits 107' in the direction of the track (the recording bit direction or the circumferential direction of the disk) will have to satisfy the following condition:

$$\lambda < 2\pi r / 1000 \text{ (mm)} \qquad (5)$$

Further, the length of the pits $\gamma$ (the maximum value of the length of the pits in the circumferential direction of the disk) should satisfy the following condition:

$$\gamma < \lambda \qquad (6)$$

However, it is preferable that the following condition is satisfied:

$$\gamma \leq 2\beta' \qquad (7)$$

Further, the lower limit value of the length $\gamma$ of the pits 107' is determined by the accuracy of the process for forming the pits, and is at best about 0.3 microns at the present time.

Further, the distance X'' from the center of one of the pits 107' among two neighboring pits along the width direction of the track to the point obtained by projecting in a perpendicular direction the center of the other neighboring pit on a line from the center of the first pit in the direction of the length of the track should satisfy the following relationship:

$$\gamma < X'' < \lambda \qquad (8)$$

In the present preferred embodiment, the position signal using the laser light is detected using the detection method and detection equipment similar to the one described in the preferred embodiment 1 and the servo method for tracking can also be the same as in the preferred embodiment 1.

As explained above, the medium in the present invention is provided directly with grooves or pits on the recording layer thereby varying the amount of light reflection in those parts, and the process of providing a layer of a material with a different reflectivity than the medium recording layer (Japanese Patent Laid Open No. 59-8172) is not carried out, and hence it is possible to make the head reach sufficiently close to the recording medium and thus is suitable for high density recording. Further, in the present invention, since it is possible to mount the semiconductor laser on the side face of the head, it is possible to detect the position of the head in the direction of the minor axis of the laser spot thereby making it possible to reduce the distance between the tracks.

In the above preferred embodiments 1 and 2, although the cases wherein mainly the optical servo method is used were described, it goes without saying that it is possible to use the known magnetic servo method also.

Embodiment 3

By using the magnetic recording equipment technology described in the first and the second preferred embodiments, it is possible to reduce the size, increase the capacity, and increase the speed of the magnetic disk apparatus. For example, when the above described technology is applied for an apparatus having one 2.5 inch disk, the storage capacity per apparatus will be 1 Gigabyte. This storage capacity is equivalent to the storage capacity of four units each having six 3.5 inch disks of the current type (each unit having a storage capacity of 250 Megabytes). As a result, in the condition in which the capacity of the unit is maintained at four times the currently marketed units, it is possible to reduce the thickness of the unit from the current value of about 4 cm to about 1 cm, and the plan area can be reduced from the current 150 cm$^2$ to 100 cm$^2$, that is, it is possible to reduce the volume of the unit from the current value of about 600 cm$^3$ to less than 100 cm$^3$, that is, a reduction by a factor of 6 can be achieved. Due to this type of size reduction, the storage apparatus itself can be used as a cartridge so that the exchange of stored information can be done between different computers. Further, the storage capacity will be about 4 Gigabytes in the condition in which the unit has the same volume as that of the units of the current type that have six 3.5 inch disks. In this case, the large capacity information storage units that are currently being used as the external storage devices in mainframe computers can be used in personal computers also, such as for example as the external storage devices in work stations, etc. In this case, it is possible to use high level operating systems (OS), such as the UNIX OS, etc., that requires 500 Megabytes or more, that can not be used currently in work stations because they require too large a storage capacity. Because such high level operating systems can be used, it will be possible to process in personal use work stations large scale operations or three dimensional picture processing operations that can only be done currently in large scale computers.

Further, by reducing the volume taken up by the unit itself, it is possible to use the unit in disk arrays. In this case, it is possible to avoid the reduction in the throughput (number of I/O accesses) that is normally associated with an increase in the storage capacity For example, the maximum storage capacity per unit of the large scale magnetic storage units that are currently being marketed is about 35 GB. The storage capacity in this case per head disk assembly is about 4.4 Gigabytes and the throughput per 1 megabyte is about 40 times / (s.MB). This can be increased to six times or more to 250 times / (s.MB) by using a unit according to the present invention with a storage capacity of 1 Gigabytes and having one 2 inch disk, thereby increasing the speed of the unit. In addition, by simply using four such 2 inch disk units, it is possible to achieve the same storage capacity as that of a unit using eight disks of 9.5 inch diameter. In other words, the increase in speed and reduction in size can be achieved simultaneously.

As is clear from the above preferred embodiments, in the present invention it is possible to realize a magnetic storage apparatus that can carry out high density recording of 1.2 Gigabits per square inch or more by combining a separated recording and reproduction head for ultra-narrow tracks wherein the recording tracks are formed by, for example, focused ion beams (FIB); a patterned medium having discrete grooves for servo provided on both sides of the recording track or pits for servo that are provided in a staggered manner around the center line of the recording track; an optical servo method or a magnetic servo method for positioning the head using the said grooves or pits; and a two stage movable actuator.

In all the above drawings, the same numerals indicate effectively the same constituent element.

What is claimed is:

1. A magnetic recording data storage system comprising:
   a magnetic recording medium having pits formed therein, the pits defining recording tracks on the magnetic recording medium and being arranged in a staggered manner relative to respective center lines of the recording tracks;
   a magnetic head including an inductive element for recording data on the recording tracks and a magnetoresistive element for reproducing data from the recording tracks;
   one of
   (1) means for magnetically producing a signal from the pits, and
   (2) optical means for optically producing a signal from the pits, the optical means including a laser for illuminating the pits;
   servo means for positioning the head on the recording tracks based on the signal produced from the pits, the servo means including a dual-stage actuator including a rough movement portion and a fine movement portion.

2. A system according to claim 1, wherein the system includes the optical means for optically producing a signal from the pits.

3. A system according to claim 2, wherein at least 1000 pits are formed in the magnetic recording medium along a circumference of the magnetic recording medium at each of the recording tracks, and wherein each of the pits is one of 3 microns square and 3 microns in diameter.

4. A system according to claim 1, wherein the magnetic recording medium has a storage capacity of at least 1.2 gigabits per square inch.

5. A system according to claim 1, wherein the magnetic head has a track width of not more than 2.5 microns.

6. A system according to claim 5, wherein the inductive element includes a magnetic material having a saturation magnetic flux density of at least 2.0 T.

7. A system according to claim 5, wherein the magnetoresistive element is one of a shunt biasing type magnetoresistive element and a soft film biasing type magnetoresistive element, and includes a magnetoresistive film and a magnetic film disposed on top of at least a portion of the magnetoresistive film for causing an exchange coupling with the magnetoresistive film.

8. A system according to claim 5, wherein the magnetic head further includes a slider supporting the inductive element and the magnetoresistive element, and wherein the slider is provided with a pair of rails that slide on the magnetic recording medium, and a groove is provided in a central portion of each of the rails extending in a direction perpendicular thereto.

9. A system according to claim 1, wherein the magnetic recording medium is one of a longitudinal magnetic recording medium and a perpendicular magnetic recording medium.

10. A system according to claim 1, wherein the magnetic head further includes a slider supporting the inductive element and the magnetoresistive element, wherein the system includes the optical means for optically producing a signal from the pits, and wherein the laser is mounted on the slider.

11. A system according to claim 1, wherein the rough movement portion of the dual-stage actuator includes an electric motor, and wherein the fine movement portion of the dual-stage actuator includes a piezoelectric element.

12. A system according to claim 1, further comprising a class 4 partial response equalizer for processing an output signal of the magnetoresistive element.

* * * * *